(12) United States Patent
Suzuki

(10) Patent No.: US 8,044,965 B2
(45) Date of Patent: Oct. 25, 2011

(54) COLOR PROCESSING APPARATUS AND METHOD

(75) Inventor: Takahiro Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 838 days.

(21) Appl. No.: 12/101,635

(22) Filed: Apr. 11, 2008

(65) Prior Publication Data

US 2009/0278856 A1 Nov. 12, 2009

(30) Foreign Application Priority Data

Apr. 26, 2007 (JP) ................................. 2007-117559

(51) Int. Cl.
| G09G 5/00 | (2006.01) |
| G09G 5/02 | (2006.01) |
| H04N 1/46 | (2006.01) |
| H04N 5/74 | (2006.01) |
| G03F 3/08 | (2006.01) |
| G06K 9/00 | (2006.01) |
| G06K 9/40 | (2006.01) |
| G06K 9/36 | (2006.01) |
| G06F 1/20 | (2006.01) |

(52) U.S. Cl. ........ 345/581; 345/428; 345/600; 345/619; 345/549; 348/33; 348/254; 348/557; 348/602; 358/504; 358/509; 358/518; 358/525; 382/167; 382/254; 382/274; 382/300

(58) Field of Classification Search .................. 345/428, 345/581, 589–591, 600–601, 606, 643, 618–619, 345/549, 597, 48, 77, 88; 348/254, 441, 348/557–560, 602–603, 33–34, 68; 358/504, 358/509, 518–519, 523, 525; 382/162–167, 382/254, 274

See application file for complete search history.

(56) References Cited

U.S. PATENT DOCUMENTS

| 5,546,195 A | 8/1996 | Arai |
| 6,072,464 A * | 6/2000 | Ozeki ........................... 345/603 |
| 2003/0020727 A1 | 1/2003 | Newman |

(Continued)

FOREIGN PATENT DOCUMENTS

JP 2002-218266 8/2002

(Continued)

OTHER PUBLICATIONS

Suesstrunk S. E. et al. "Chromatic adaptation performance of different RGB sensors" Proceedings of the SPIE, SPIE, Bellingham, VA, vol. 4300, Jan. 1, 2001, pp. 172-183, XP002272200 ISSN: 0277-786X.

(Continued)

*Primary Examiner* — Wesner Sajous
(74) *Attorney, Agent, or Firm* — Cowan, Liebowitz & Latman, P.C.

(57) ABSTRACT

In order to calculate the calorimetric value of a color patch under a given viewing illuminant, a plurality of colorimetric value sets obtained by measuring the colors of color patches under a plurality of illuminants are stored in a memory, the type of spectral distribution and white point information of the viewing illuminant are obtained (S12), and a calorimetric value set corresponding to the type of spectral distribution of the viewing illuminant is selected (S13). A colorimetric value set under the viewing illuminant is calculated from the selected calorimetric value set, on the basis of the white point information of the viewing illuminant and the white point information of the illuminant of the selected colorimetric value set (S14).

7 Claims, 15 Drawing Sheets

U.S. PATENT DOCUMENTS

2003/0072043 A1* 4/2003 Hagai et al. .................... 358/518
2005/0078122 A1 4/2005 Ohga
2009/0284586 A1* 11/2009 Ramstad ......................... 348/60

FOREIGN PATENT DOCUMENTS

JP 3634633 1/2005

OTHER PUBLICATIONS

All of the above references were cited in a Aug. 14, 2008 European Search Report of the counterpart European Patent Application No. 08155171.5.

* cited by examiner

FIG. 5

| ILLUMINANT NAME | TYPE OF SPECTRAL DISTRIBUTION | WHITE POINT INFORMATION |
|---|---|---|
| N-EDL | BROAD-BAND TYPE | (*,*,*) |
| L-EDL | BROAD-BAND TYPE | (*,*,*) |
| D-SDL | BROAD-BAND TYPE | (*,*,*) |
| N-SDL | BROAD-BAND TYPE | (*,*,*) |
| EX-WW | THREE-BAND TYPE | (*,*,*) |
| EX-D | THREE-BAND TYPE | (*,*,*) |
| W | NORMAL TYPE | (*,*,*) |
| ⋮ | ⋮ | ⋮ |

FIG. 7

| BROAD-BAND TYPE | | | | NORMAL TYPE | | | | THREE-BAND TYPE | | | |
|---|---|---|---|---|---|---|---|---|---|---|---|
| D50 (5000K) | | | | W (4200K) | | | | EX-N (5000K) | | | |
| COLOR PATCH No. | X | Y | Z | COLOR PATCH No. | X | Y | Z | COLOR PATCH No. | X | Y | Z |
| 1 | **** | **** | **** | 1 | **** | **** | **** | 1 | **** | **** | **** |
| 2 | **** | **** | **** | 2 | **** | **** | **** | 2 | **** | **** | **** |
| 3 | **** | **** | **** | 3 | **** | **** | **** | 3 | **** | **** | **** |
| 4 ...... | **** ... **** | **** ... **** | **** ... **** | 4 ...... | **** ... **** | **** ... **** | **** ... **** | 4 ...... | **** ... **** | **** ... **** | **** ... **** |
| A (2556K) | | | | WW (3500K) | | | | EX-L (3000K) | | | |
| COLOR PATCH No. | X | Y | Z | COLOR PATCH No. | X | Y | Z | COLOR PATCH No. | X | Y | Z |
| 1 | **** | **** | **** | 1 | **** | **** | **** | 1 | **** | **** | **** |
| 2 | **** | **** | **** | 2 | **** | **** | **** | 2 | **** | **** | **** |
| 3 | **** | **** | **** | 3 | **** | **** | **** | 3 | **** | **** | **** |
| 4 ...... | **** ... **** | **** ... **** | **** ... **** | 4 ...... | **** ... **** | **** ... **** | **** ... **** | 4 ...... | **** ... **** | **** ... **** | **** ... **** |

COLOR PROCESSING APPARATUS AND METHOD

BACKGROUND OF THE INVENTION

1. Field of the Invention

The present invention relates to a color processing apparatus which calculates a calorimetric value under a given viewing illuminant and a method thereof.

2. Description of the Related Art

With the prevalence of personal computers, a large number of people have started to use image input devices such as a digital cameras, image scanners, and the like. Opportunities have increased to input an image by an image input device, to display the image on an image display device such as a cathode-ray tube (CRT), liquid crystal panel (LCD), or the like, and to output the image using an image output device such as a printer or the like. In this case, a color matching process (gamut mapping) is necessary to correct differences in color appearance caused by differences in color gamut between the image input device, image display device, and image output device.

A color matching process is a process for associating, the colors of the respective devices with each other, based on a device profile which describes color reproducing characteristic data of the respective devices subject to color matching. For example, in case of a printer, color reproducing characteristic data is data obtained by measuring the color of a color patch output by the printer.

A color matching process can absorb differences in color appearance between devices. However, when an illuminant (to be referred to as a viewing illuminant, hereinafter) under which an image is viewed is different from an illuminant (to be referred to as a colorimetric illuminant, hereinafter) upon color measurement for obtaining color reproducing characteristic data, colors cannot be matched. In other words, colorimetric measurement needs to be done under a viewing illuminant to obtain color reproducing characteristic data to be described in a device profile.

As a method of obtaining a colorimetric value under a viewing illuminant, for example, a technique disclosed in Japanese Patent Laid-Open No. 2002-218266 is available. This technique measures a color patch output by a device subject to color matching by using a spectrophotometer, and measures a viewing illuminant by using a spectral radiance meter. Then, a tristimulus value of CIEXYZ is calculated from the spectral reflectance of the color patch and the spectral radiance of the viewing illuminant, and is described in a device profile.

According to this technique, a colorimetric value under a viewing illuminant can be accurately calculated. However, the size of spectral reflectance data of color patches is too large to hold in a memory, device profile, or the like.

SUMMARY OF THE INVENTION

In one aspect, a color processing apparatus, comprises: a memory for storing a plurality of calorimetric value sets obtained by measuring colors of color patches under a plurality of illuminants; an obtaining section, arranged to obtain a type of spectral distribution and white color information of a viewing illuminant; a selector, operable to select a calorimetric value set corresponding to the type of spectral distribution of the viewing illuminant from the memory; and a calculator, arranged to calculate a calorimetric value set under the viewing illuminant from the selected colorimetric value set, on the basis of the white point information of the viewing illuminant and white point information of an illuminant of the selected calorimetric value set.

In another aspect, a method of a color processing using a plurality of colorimetric value sets obtained by measuring colors of color patches under a plurality of illuminants, the method comprises the steps of: obtaining a type of spectral distribution and white color information of a viewing illuminant; selecting a calorimetric value set corresponding to the type of spectral distribution of the viewing illuminant; and calculating a colorimetric value set under the viewing illuminant from the selected calorimetric value set, on the basis of the white point information of the viewing illuminant and white point information of an illuminant of the selected colorimetric value set.

According to these aspects, it is possible to calculate the colorimetric value of a color patch under a given viewing illuminant.

Further features of the present invention will become apparent from the following description of exemplary embodiments with reference to the attached drawings.

BRIEF DESCRIPTION OF THE DRAWINGS

FIG. 5 is a view illustrating an example of a table held by a table holding unit;

FIG. 7 is a view illustrating examples of colorimetric values under reference illuminants that are held by a calorimetric value holding unit;

DESCRIPTION OF THE EMBODIMENTS

A color processing apparatus and a method according to the present invention will now be described in detail with reference to the accompanying drawings.

First Embodiment

[Arrangement of Apparatus]

Figure 1:
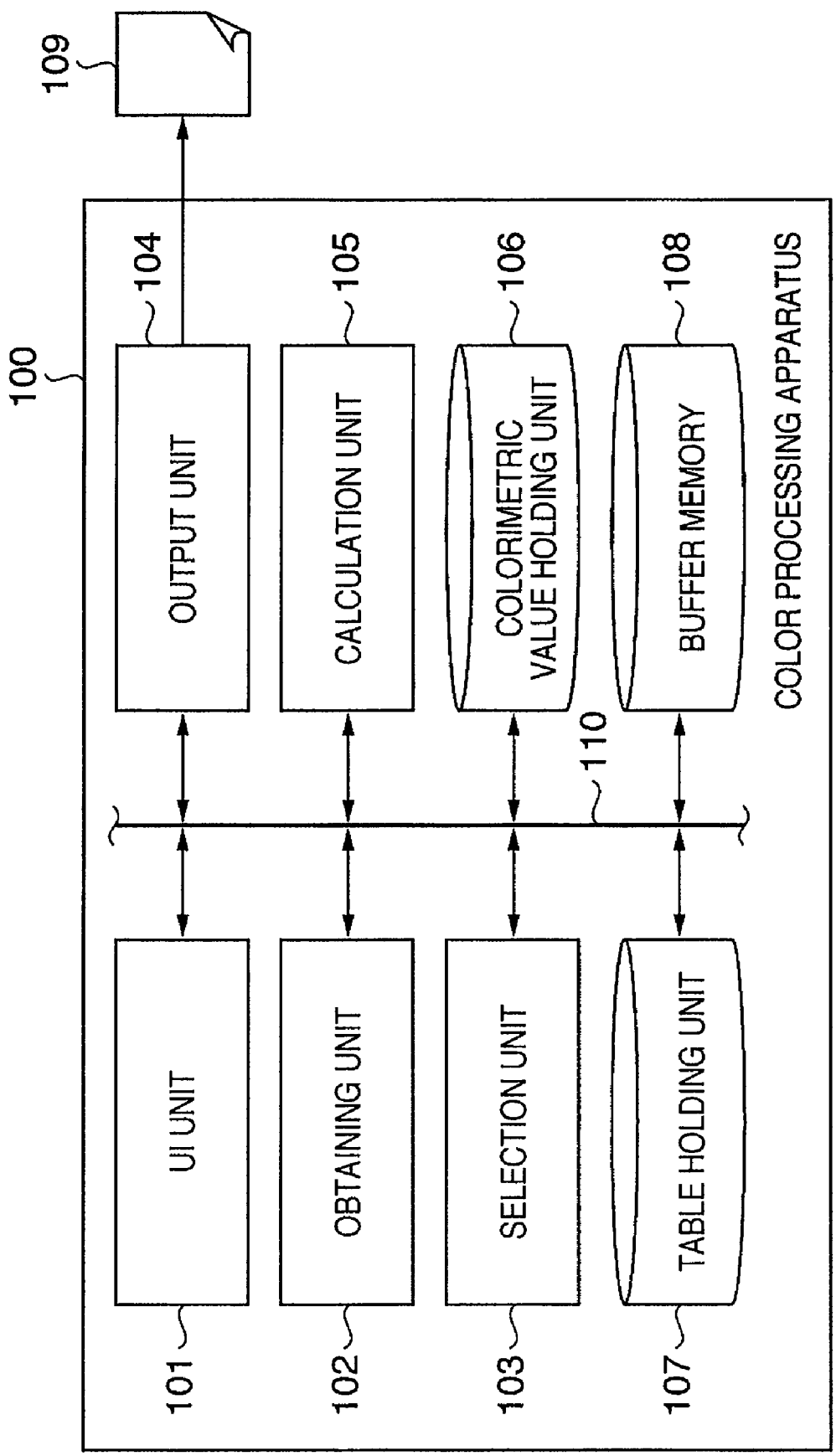
FIG. 1 is a block diagram showing the arrangement of a color processing apparatus of the first embodiment.

FIG. 1 is a block diagram showing the arrangement of a color processing apparatus 100 of the first embodiment.

A user interface (UI) unit 101 provides a user interface for a user to designate a viewing illuminant and file output (file name or output destination). That is, the UI unit 101 provides a video interface for displaying a graphical user interface (GUI) on a monitor (not shown) or the like. In addition, the UI unit 101 provides an input interface for connecting a pointing device such as a keyboard, mouse, touch panel, dial, or the like (not shown).

An obtaining unit 102 obtains the type of spectral distribution and white point information of a viewing illuminant designated by the user from a table holding unit 107. The table holding unit 107 holds a table which describes the correspondence between an illuminant name, type of spectral distribution, and color information.

A selection unit 103 selects from a colorimetric value holding unit 106 a calorimetric value of a color patch corresponding to the type of spectral distribution of the viewing illuminant obtained by the obtaining unit 102. The colorimetric value holding unit 106 holds a plurality of calorimetric values of color patches measured under a plurality of reference illuminants.

A calculation unit 105 calculates or obtains the colorimetric value of the color patch corresponding to the white point information of the viewing illuminant obtained by the obtaining unit 102, from the colorimetric value of the color patch selected by the selection unit 103. A buffer memory 108 is a work memory used for processing in the color processing apparatus 100 and temporarily storing information being processed or an operation result.

An output unit 104 outputs a file 109 which describes the calorimetric value calculated by the calculation unit 105 in a predetermined format, in accordance with a user's instruction. The output unit 104 connects to a serial bus such as a USB (Universal Serial Bus) or IEEE1394 or a network. Therefore, it is possible to send the file 109 to a computer apparatus or image input/output apparatus (e.g., a digital camera, scanner, printer, or the like) to perform a color matching process, or to a storage device or server device.

The respective components described above are connected to each other via a system bus 110.

[Operation of Apparatus]

Figure 2:
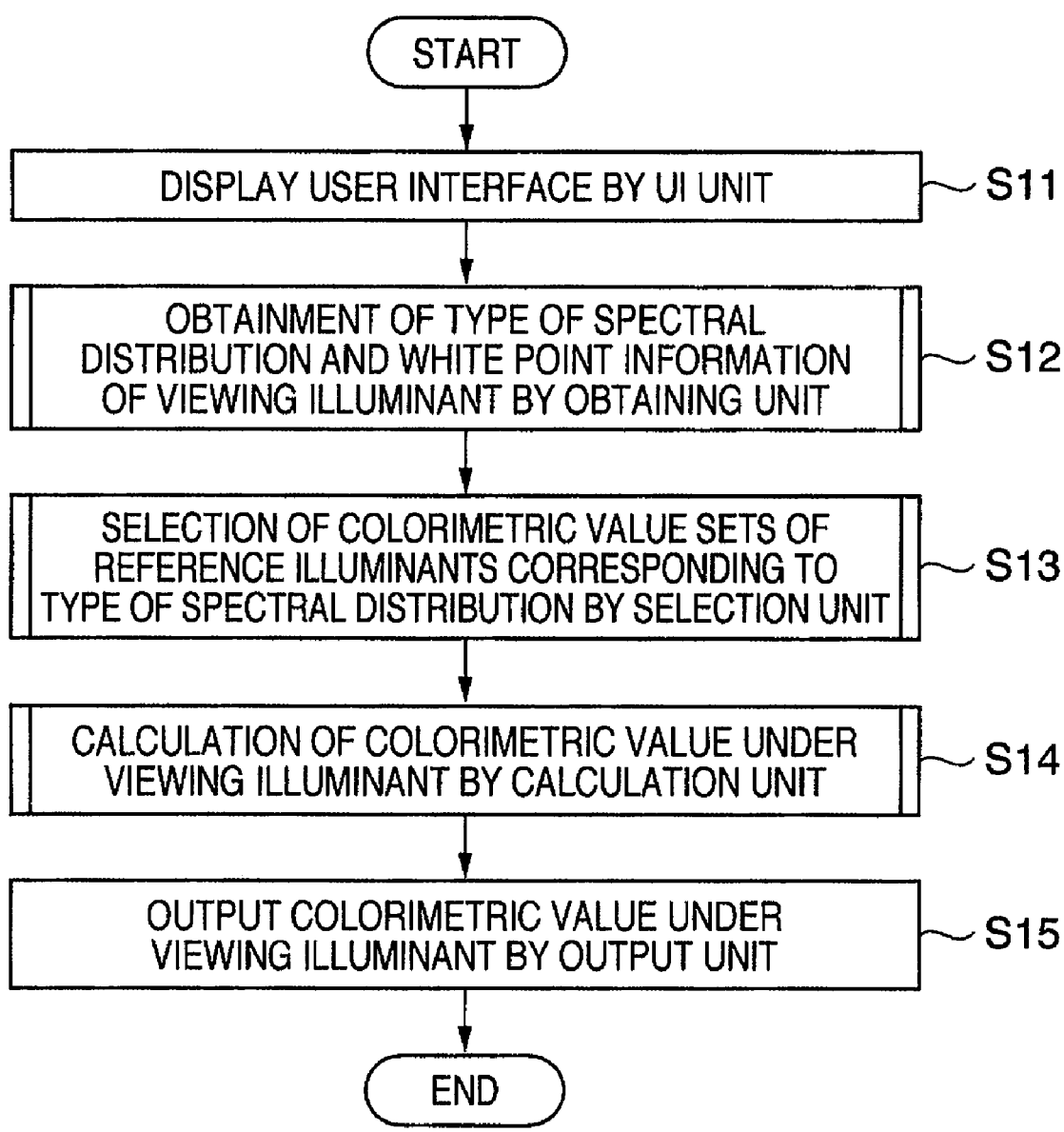
FIG. 2 is a flowchart illustrating the process of the color processing apparatus.

FIG. 2 is a flowchart illustrating operation of the color processing apparatus 100.

The UI unit 101 displays a user interface for a user to input information required to calculate a calorimetric value on a monitor (S11).

Figure 3:
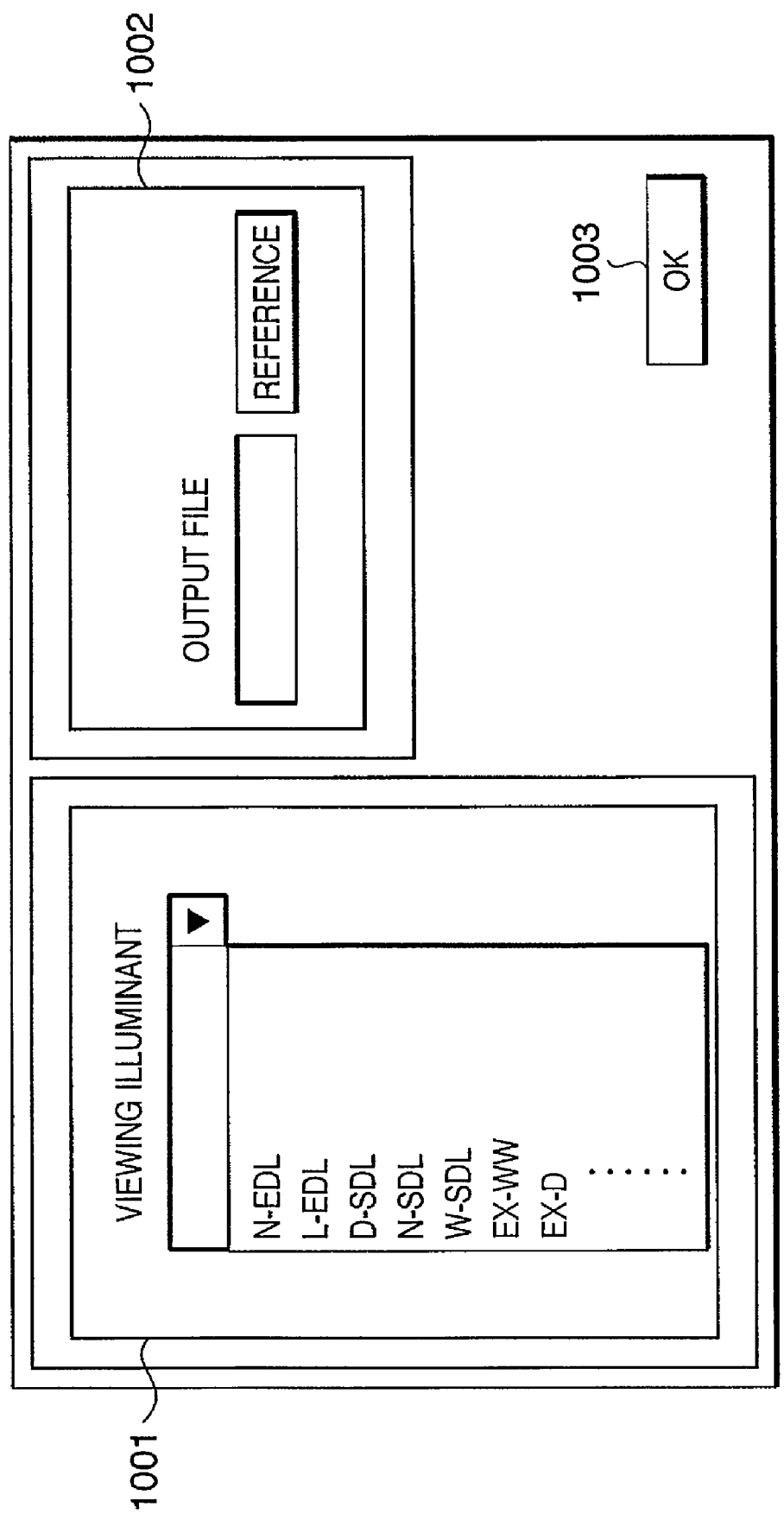
FIG. 3 is a view illustrating an example of a user interface.

FIG. 3 is a view illustrating an example of the user interface displayed in step S11. The user interface includes a viewing illuminant setting section 1001 for inputting or selecting a name or symbol representing the type of a viewing illuminant, and an output file setting section 1002 for inputting or setting the file name or path name of the file 109 which describes a calorimetric value as a calculation result.

The user uses a keyboard, mouse, touch screen, or the like to operate the pull-down menu of the viewing illuminant setting section 1001 or to set a file name in the output file setting section 1002. When input of required instructions (user instructions) is complete, the user presses an OK button 1003. Note that light color symbols (e.g., JIS Z 9112 or the like) of typical illuminants defined by Japanese Industrial Standards (JIS) are set in the pull-down menu of the viewing illuminant setting section 1001.

The obtaining unit 102 obtains the type of spectral distribution and white point information of the viewing illuminant from the table holding unit 107 based on the name or symbol of the viewing illuminant set in the viewing illuminant setting section 1001 by the user (S12). The selection unit 103 selects colorimetric value sets of color patches measured under reference illuminants corresponding to the type of spectral distribution of the viewing illuminant obtained by the obtaining unit 102 (S13).

The calculation unit 105 calculates or obtains a colorimetric value corresponding to the white point information of the viewing illuminant obtained by the obtaining unit 102, from each colorimetric value set selected by the selection unit 103 (S14). The output unit 104 formats the colorimetric value calculated by the calculation unit 105 in the file 109 in a predetermined format and outputs the file 109 in accordance with the setting in the output file setting section 1002 (S15).

Obtaining Unit

Figure 4:
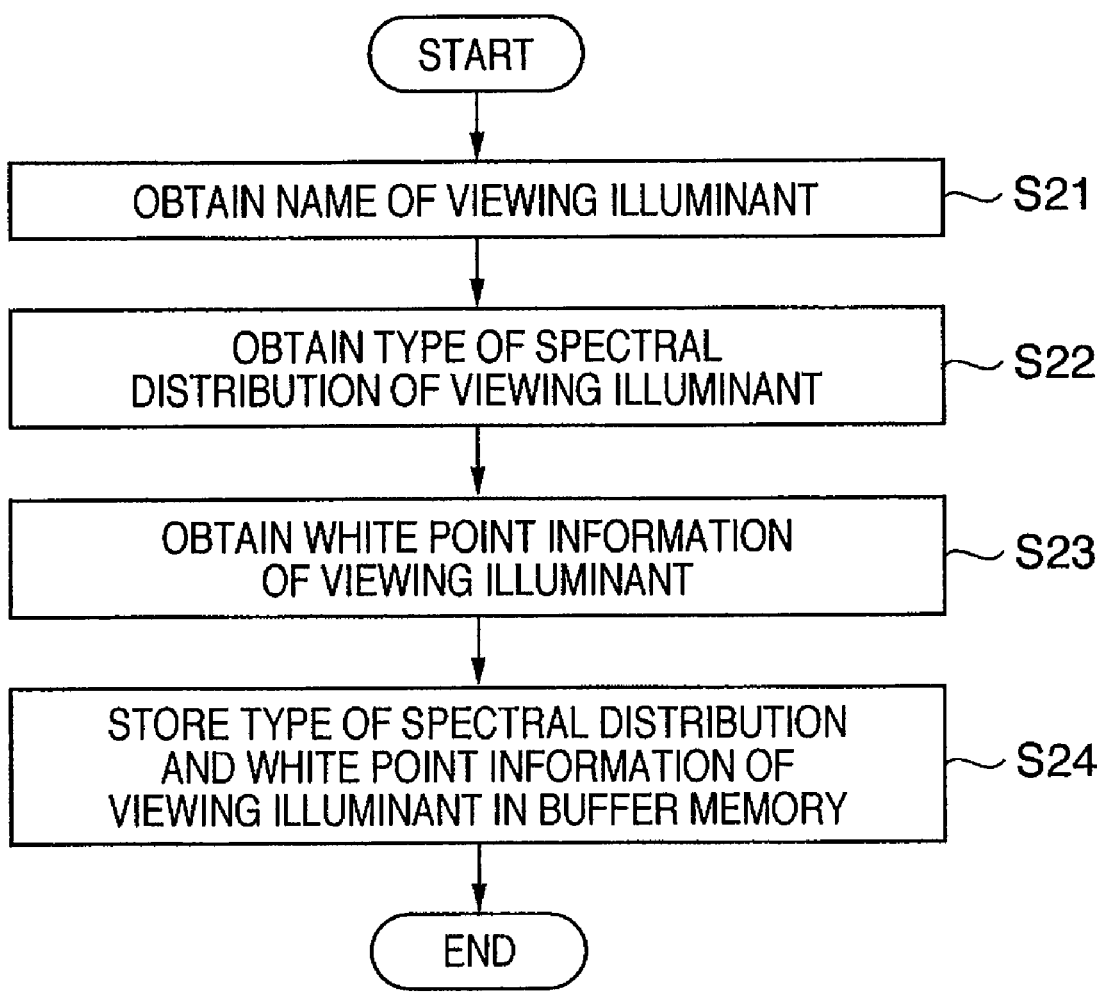
FIG. 4 is a flowchart for explaining the operation of an obtaining unit.

FIG. 4 is a flowchart for explaining the operation (S12) of the obtaining unit 102.

When the OK button 1003 shown in FIG. 3 is pressed, the obtaining unit 102 obtains the name or symbol of the viewing illuminant set in the viewing illuminant setting section 1001 (S21). The obtaining unit 102 then obtains the type of spectral distribution and white point information corresponding to the name or symbol of the viewing illuminant from a table held in the table holding unit 107 (S22 and S23).

FIG. 5 is a view illustrating an example of the table held by the table holding unit 107. In this example, the table includes the symbol (illuminant name) of an illuminant set in the pull-down menu of the viewing illuminant setting section 1001 of the user interface and the corresponding type of spectral distribution (color rendering property) and white point information. In this embodiment, a CIEXYZ value is used as the white point information.

The obtaining unit 102 then stores the obtained type of spectral distribution and white point information of the viewing illuminant in a predetermined area of the buffer memory 108 (S24).

Selection Unit

Figure 6:
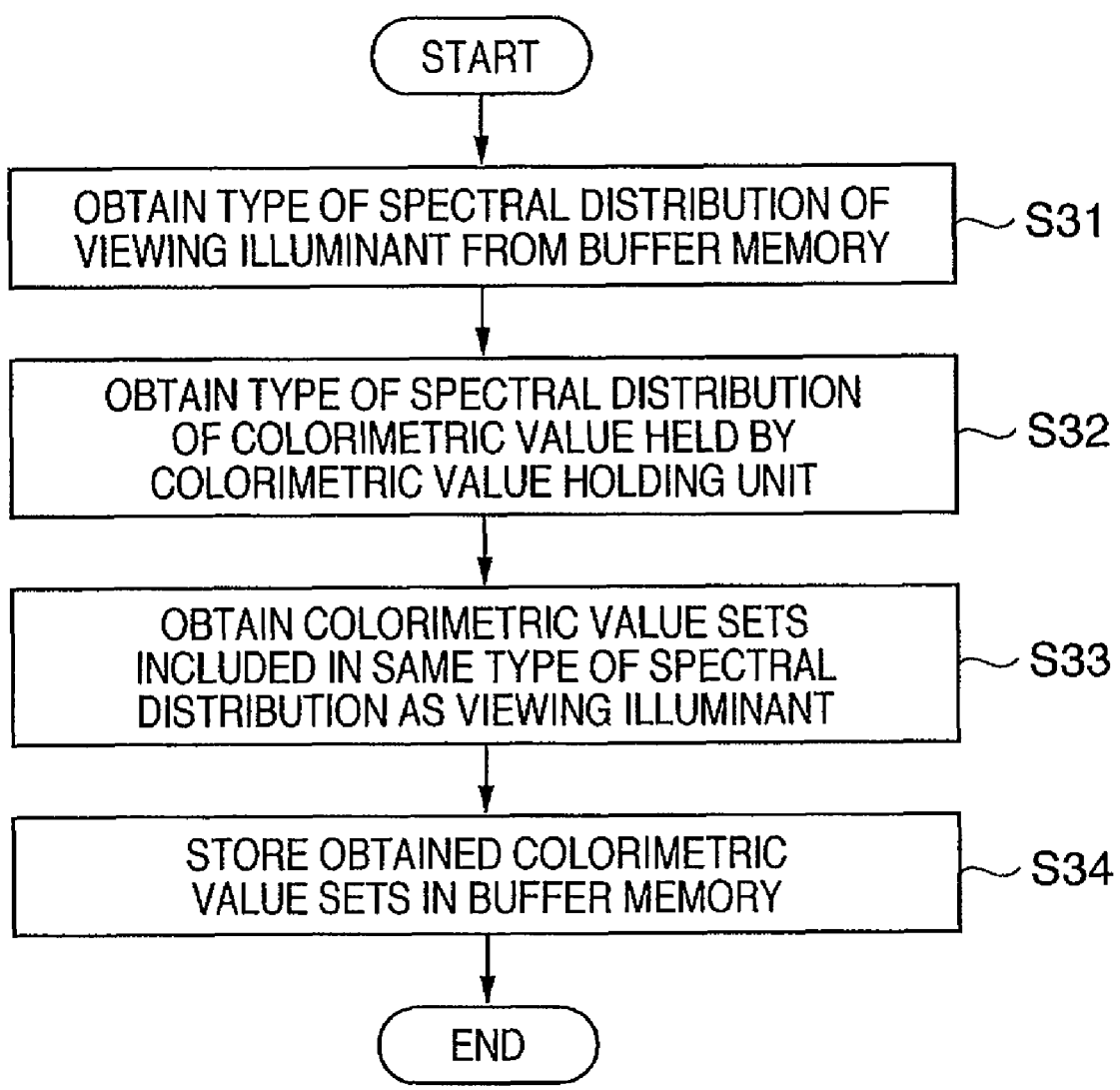
FIG. 6 is a flowchart for explaining the operation of a selection unit.

FIG. 6 is a flowchart for explaining the operation (S13) of the selection unit 103.

The selection unit 103 obtains the type of spectral distribution of the viewing illuminant stored in the buffer memory 108 (S31). The selection unit 103 then obtains the type of spectral distribution of calorimetric values held by the calorimetric value holding unit 106 (S32).

FIG. 7 is a view illustrating an example of calorimetric values under reference illuminants, which are held by the calorimetric value holding unit 106. The calorimetric value holding unit 106 holds, for each type of spectral distribution of reference illuminant, colorimetric value sets under a plurality of reference illuminants having different white points. The colorimetric value set includes data obtained by measuring the colors of predetermined color patches output by a device subject to color matching under the corresponding reference illuminant, or data obtained from an operation using the spectral reflectances of predetermined color patches and the spectral radiance of the reference illuminant. This data is provided in a CIEXYZ format. The colorimetric values under each reference illuminant are arranged in the order of corresponding color patches. In FIG. 7, for example, a colorimetric value corresponding to color patch number n under the W illuminant and that corresponding to color patch number n under the WW illuminant are those colorimetric values obtained by measuring the color of the same color patch of color patch number n under those different illuminants.

The selection unit 103 obtains all the colorimetric value sets of the same type of spectral distribution as the viewing illuminant from the calorimetric value holding unit 106 (S33). For example, when the type of spectral distribution of the viewing illuminant is "broad-band type", the selection unit 103 obtains all the colorimetric value sets included in the type of spectral distribution of "broad-band type", that is, the calorimetric value set under the D50 illuminant and that under the A illuminant in the example shown in FIG. 7.

The selection unit 103 stores the obtained colorimetric value sets in a predetermined area of the buffer memory 108 (S34).

Calculation Unit

Figure 8:
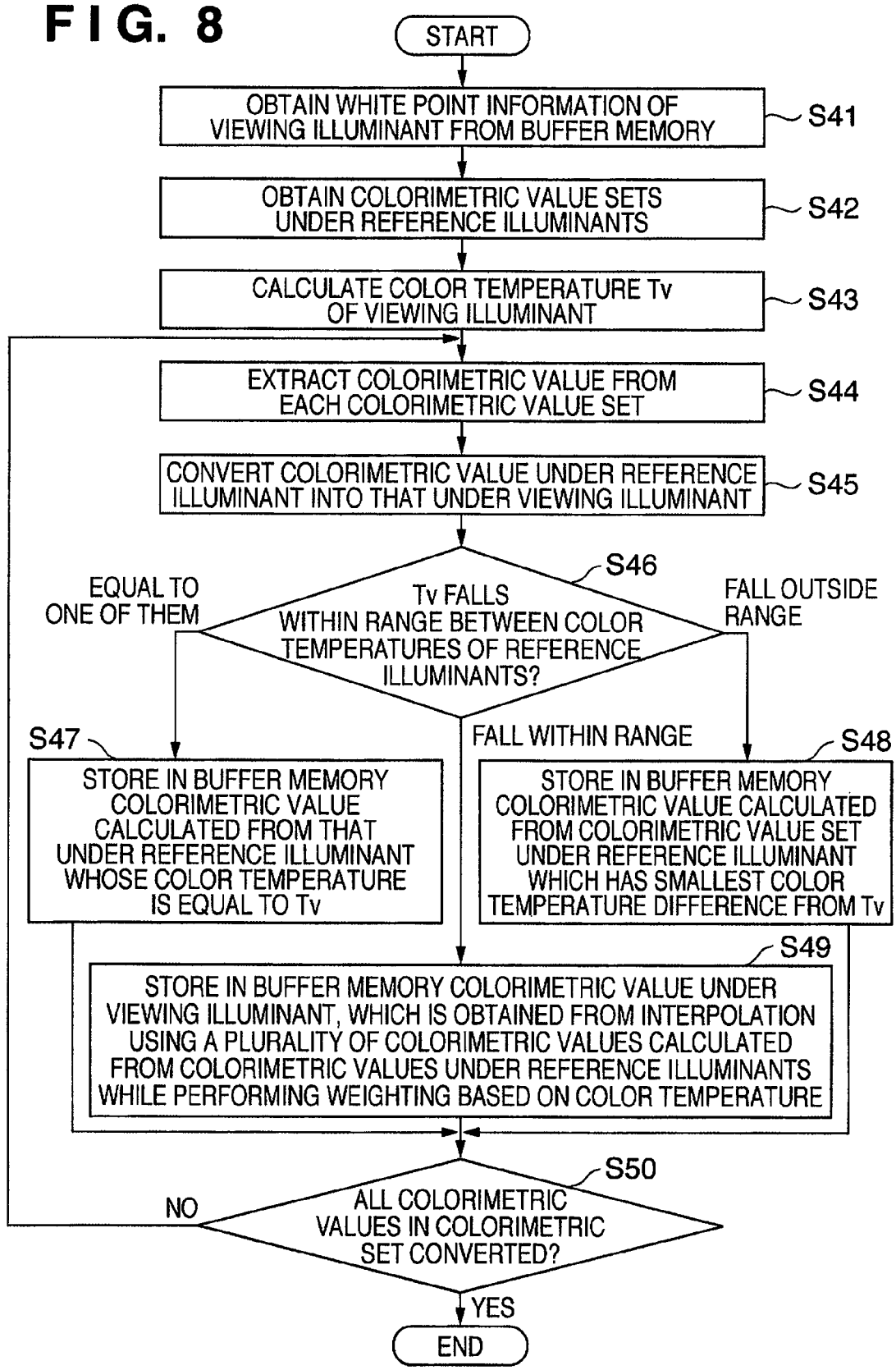
FIG. 8 is a flowchart for explaining the operation of a calculation unit.

FIG. 8 is a flowchart for explaining the operation (S14) of the calculation unit 105.

The calculation unit 105 obtains from the buffer memory 108 the white point information of the viewing illuminant and the colorimetric value sets selected by the selection unit 103 (S41 and S42). The calculation unit 105 then calculates a color temperature Tv of the viewing illuminant from the CIEXYZ value of the white point information of the viewing illuminant (S43), for example, by:

$$Tv = -437 \times n^3 + 3601 \times n^2 - 6861 \times n + 5514.3 \quad (1)$$

where $n = (x - 0.3320)/(y - 0.1858)$
$x = X/(X+Y+Z)$
$y = Y/(X+Y+Z)$

The calculation unit 105 extracts a colorimetric value from each of the obtained calorimetric value sets (S44). The calculation unit 105 then converts each of the two extracted colorimetric values into calorimetric value under the viewing illuminant by using illuminant conversion (S45). This embodiment exemplifies a case in which the Von Kries transform is used, which is expressed by:

$$\begin{bmatrix} X2 \\ Y2 \\ Z2 \end{bmatrix} = [\text{inv\_Mat}] \begin{bmatrix} Pw2/Pw1 & 0 & 0 \\ 0 & Qw2/Qw1 & 0 \\ 0 & 0 & Rw2/Rw1 \end{bmatrix} [\text{Mat}] \begin{bmatrix} X1 \\ Y1 \\ Z1 \end{bmatrix} \quad (2)$$

where $$\begin{bmatrix} Pw1 \\ Qw1 \\ Rw1 \end{bmatrix} = [\text{Mat}] \begin{bmatrix} Xw1 \\ Yw1 \\ Zw1 \end{bmatrix}$$

$$\begin{bmatrix} Pw2 \\ Qw2 \\ Rw2 \end{bmatrix} = [\text{Mat}] \begin{bmatrix} Xw2 \\ Yw2 \\ Zw2 \end{bmatrix}$$

$$[\text{Mat}] = \begin{bmatrix} 0.44024 & 0.70760 & -0.08081 \\ -0.22630 & 1.16532 & 0.04570 \\ 0 & 0 & 0.91822 \end{bmatrix}$$

$$[\text{inv\_Mat}] = \begin{bmatrix} 1.85995 & -1.12939 & 0.21990 \\ 0.36119 & 0.63881 & 0 \\ 0 & 0 & 1.08906 \end{bmatrix}$$

where X1, Y1, and Z1 represent the colorimetric value under the reference illuminant, X2, Y2, and Z2 represent the colorimetric value under the viewing illuminant, Xw1, Yw1, and Zw1 represent the X, Y, and Z values, respectively, of the white point of the reference illuminant, and Xw2, Yw2, and Zw2 represent the X, Y, and Z values, respectively, of the white point of the viewing illuminant.

Note that as the XYZ value Xw1Yw1Zw1 of the white point of the reference illuminant, a value defined in correspondence with the type (e.g., A or D50) of the reference illuminant is used.

The calculation unit 105 compares the color temperature Tv of the viewing illuminant with a color temperature Tn of the reference illuminant, thereby branching the processing (S46). Assuming that the selection unit 103 obtained the colorimetric value set under the D50 illuminant and that under the A illuminant, the types of spectral distribution of which are both included in the "broad-band type" as shown in FIG. 7, the calculation unit 105 determines whether $2556K < Tv < 5000K$ holds, thereby branching the processing.

When $Tv = 2556K$ or $5000K$ (equal to one of them), the calculation unit 105 stores the calorimetric value calculated from the calorimetric value set under the A illuminant or that calculated from the colorimetric value set under the D50 illuminant in a predetermined area of the buffer memory 108 (S47).

When $Tv < 2556K$ or $5000K > Tv$ (Tv falls outside the range), the calculation unit 105 stores the calorimetric value calculated from the colorimetric value set under the reference illuminant which has a smaller difference in color temperature from Tv in a predetermined area of the buffer memory 108 (S48).

When $Tv = 2556K$ or $5000K$ (equal to one of them), the calculation unit 105 stores the colorimetric value set under the A illuminant or the colorimetric value set under the D50 illuminant in a predetermined area of the buffer memory 108 as the colorimetric values under the viewing illuminant (S47).

$$\begin{bmatrix} X3 \\ Y3 \\ Z3 \end{bmatrix} = w1 \begin{bmatrix} X2_{T1} \\ Y2_{T1} \\ Z2_{T1} \end{bmatrix} + w2 \begin{bmatrix} X2_{T2} \\ Y2_{T2} \\ Z2_{T2} \end{bmatrix} \quad (3)$$

where X3, Y3, and Z3 represent the calorimetric value obtained by interpolation, $X2_{T1}, Y2_{T1}$, and $Z2_{T1}$ represent the calorimetric value calculated from the calorimetric value set of the reference illuminant (T1), and $X2_{T2}, Y2_{T2}$, and $Z2_{T2}$ represent the calorimetric value calculated from the colorimetric value set of the reference illuminant (T2).

Weight $w1 = (T2-Tv)/(T2-T1)$

Weight $w2 = (Tv-T1)/(T2-T1)$ for $T1 < Tv < T2$

The calculation unit 105 determines whether all the calorimetric values of the calorimetric value set have been converted (S50). The calculation unit 105 repeats the processing in steps S44 to S49 until all the colorimetric values are converted.

The output unit 104 obtains the colorimetric values calculated or obtained in this manner from a predetermined area of the buffer memory 108, describes them in the file 109 in a predetermined format, and outputs the file 109 in accordance with the setting in the output file setting section 1002.

In this manner, according to the first embodiment, a colorimetric value set corresponding to the type of spectral distribution of the viewing illuminant is selected from the colorimetric value sets held in the colorimetric value holding unit 106. A colorimetric value under the viewing illuminant is calculated or obtained from the selected colorimetric value set. That is, a colorimetric value under the viewing illuminant is calculated or obtained from the colorimetric value under the illuminant having a spectral distribution similar to that of the viewing illuminant. Therefore, for example, as compared to a case in which a colorimetric value set is selected based on the XYZ information of the white point of the illuminant, estimation with a high accuracy is possible which considers characteristics such as a color rendition property of the illuminant.

The type of spectral distribution and white point information of the viewing illuminant are obtained based on the name of the viewing illuminant that is obtained from, for example, catalogue specifications and designated by the user, and colorimetric values under the reference illuminants corresponding to the type of spectral distribution of the viewing illuminant are selected. From the selected colorimetric values under the reference illuminants, the colorimetric value of the viewing illuminant is calculated or obtained while considering the white point information of the viewing illuminant. Accordingly, it is possible to obtain the colorimetric value under the viewing illuminant based on the name of the viewing illuminant without measuring the viewing illuminant by a spectral radiance meter. When the colorimetric values of color patches are held as spectral reflectances, the data size becomes large. In this method, however, since the colorimetric values of color patches are held as colorimetric values under a plurality of reference illuminants, the size of a data file to hold them and that of a memory used for operations can be suppressed.

Modification of Embodiment

The first embodiment has exemplified a case in which a light color symbol is used to select a viewing illuminant. However, a reference illuminant or supplementary reference illuminant such as A, C or D illuminant or an F number, which is a reference for fluorescent lamps, defined by Commission Internationale de l'Eclairage (CIE) may also be used. That is, any name or symbol may be used as long as it can specify the type of illuminant.

When the calorimetric value holding unit 106 holds calorimetric value sets under three or more reference illuminants corresponding to the type of spectral distribution of a viewing illuminant, the selection unit 103 calculates the color temperature Tv of the viewing illuminant by using equation (1). When there is a reference illuminant having the same color temperature as the color temperature Tv, the selection unit 103 selects the calorimetric value set under that reference illuminant. When the color temperature Tv falls "outside the range" as described above, the selection unit 103 selects the calorimetric value set under the reference illuminant which has a smallest color temperature difference from Tv. In these cases, the calculation unit 105 assumes that the color temperature of the reference illuminant is equal to Tv and performs the processing in step S47.

When Tv falls within the range between the color temperatures of the reference illuminants, the selection unit 103 selects the calorimetric value sets under the two reference illuminants, one of which has a color temperature smaller than Tv and the other has a color temperature larger than Tv. In this case, the calculation unit 105 performs the above-described interpolation processing in step S49.

In the above description, the Von Kries transform is used as an illuminant conversion model used for illuminant conversion. However, another model such as a CIECAM02 or Hunt model may be used as an alternative.

In the above description, a user designates a viewing illuminant by using the UI unit. However, when the information of a viewing illuminant can be automatically obtained by another method, designation using the UI unit is unnecessary. For example, when the viewing illuminant information of an output destination is included in an image file in advance, designation using the UI unit is unnecessary.

Second Embodiment

Color processing of the second embodiment according to the present invention will now be described. Note that the same components as in the first embodiment are denoted by the same reference numerals in the second embodiment, and a detailed description thereof will not be repeated.

[Arrangement of Apparatus]

Figure 9:
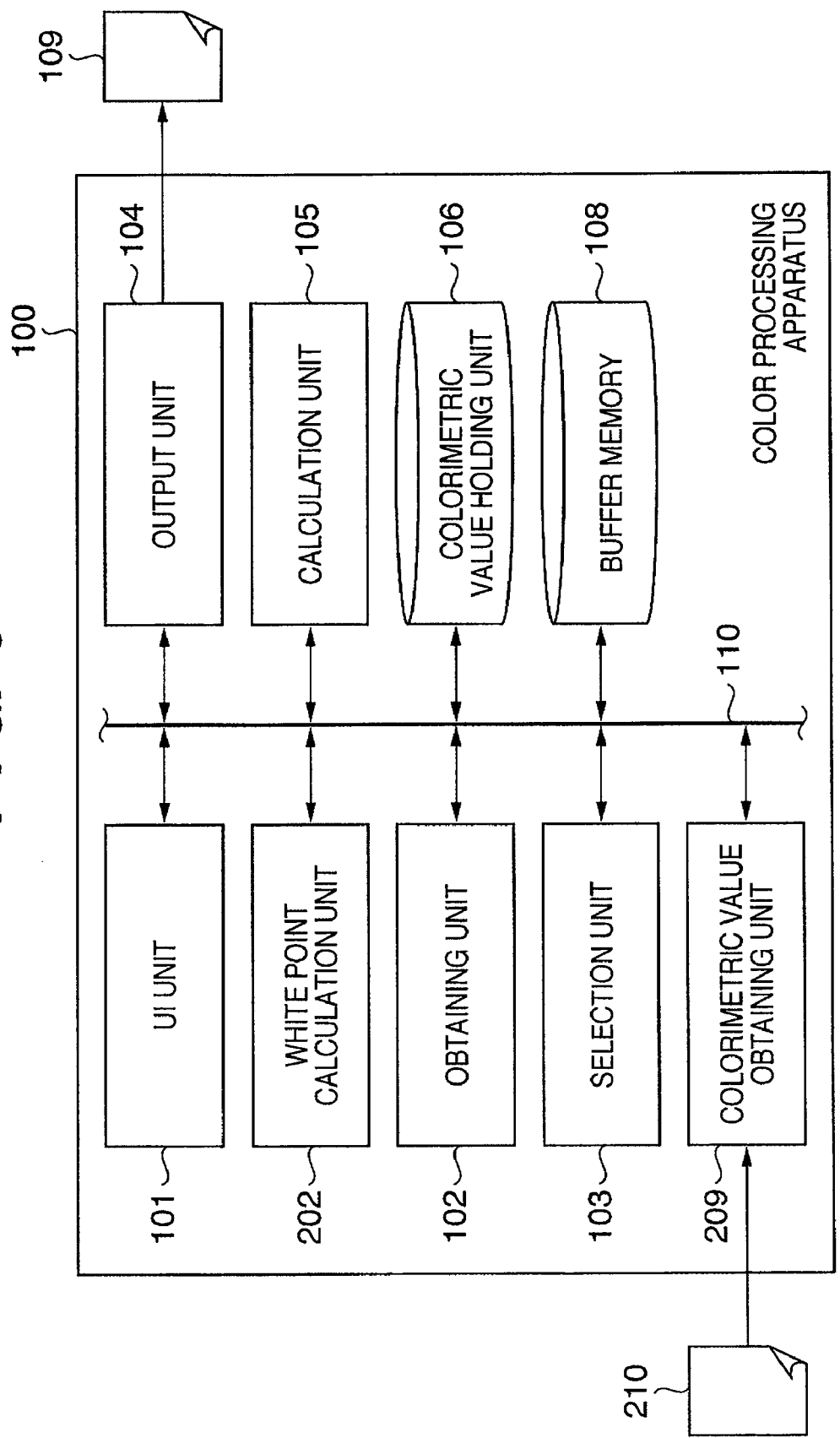
FIG. 9 is a block diagram showing the arrangement of a color processing apparatus of the second embodiment.

FIG. 9 is a block diagram showing the arrangement of a color processing apparatus 100 of the second embodiment. The arrangement of the color processing apparatus 100 is different from that of the first embodiment shown in FIG. 1 in that the color processing apparatus 100 comprises no table holding unit 107 but a white point calculation unit 202 and a calorimetric value obtaining unit 209.

The white point calculation unit 202 calculates the white point information of a viewing illuminant from the information of the viewing illuminant designated by a user. The colorimetric value obtaining unit 209 obtains, from an input file 210 designated by the user by operating a user interface provided by a UI unit 101, a calorimetric value set obtained by measuring the colors of color patches under a reference illuminant.

[Operation of Apparatus]

Figure 10:
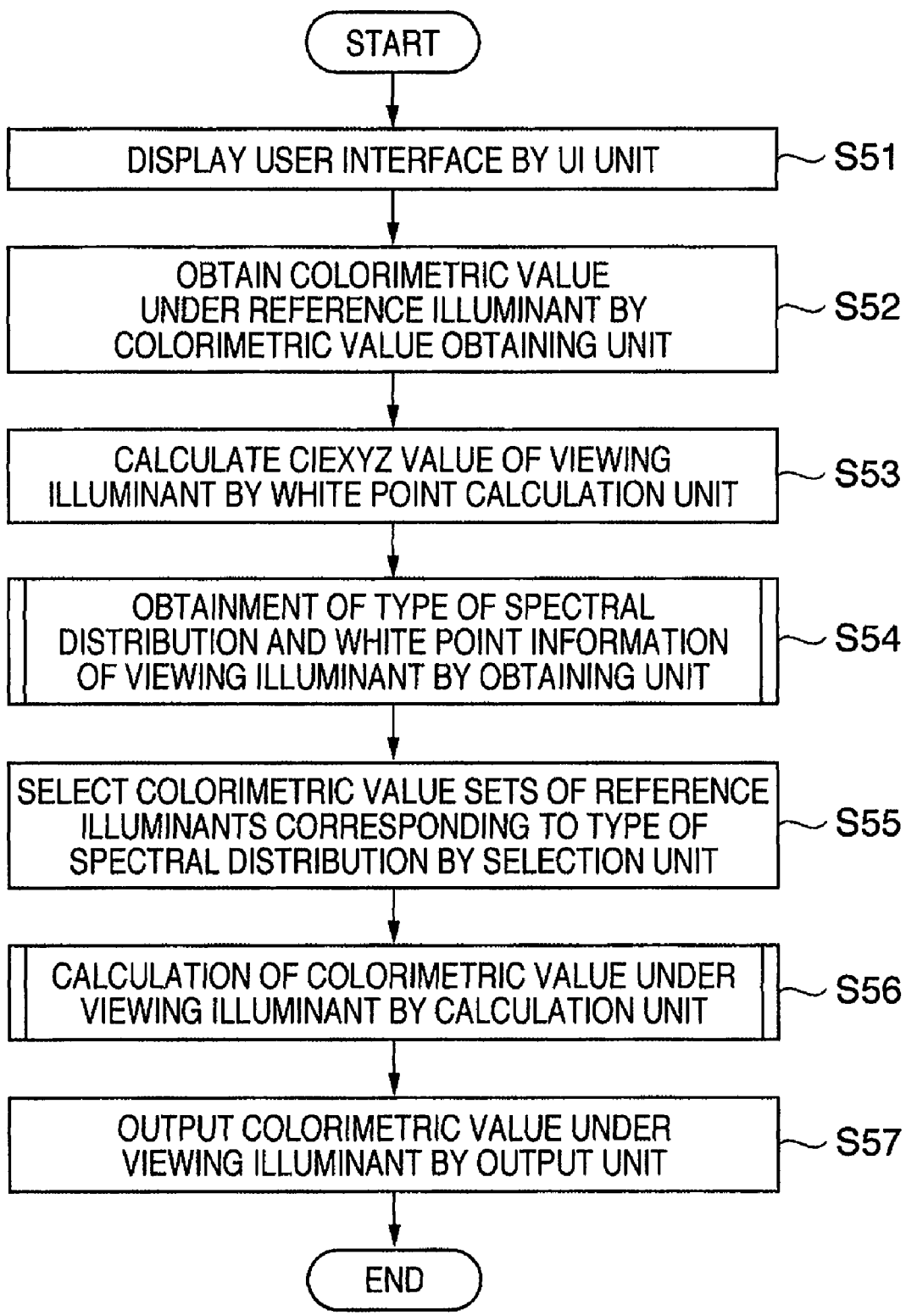
FIG. 10 is a flowchart illustrating the process of the color processing apparatus.

FIG. 10 is a flowchart illustrating the process of the color processing apparatus 100.

The UI unit 101 displays a user interface for a user to input information required to calculate a colorimetric value on a monitor (not shown) (S51).

Figure 11:
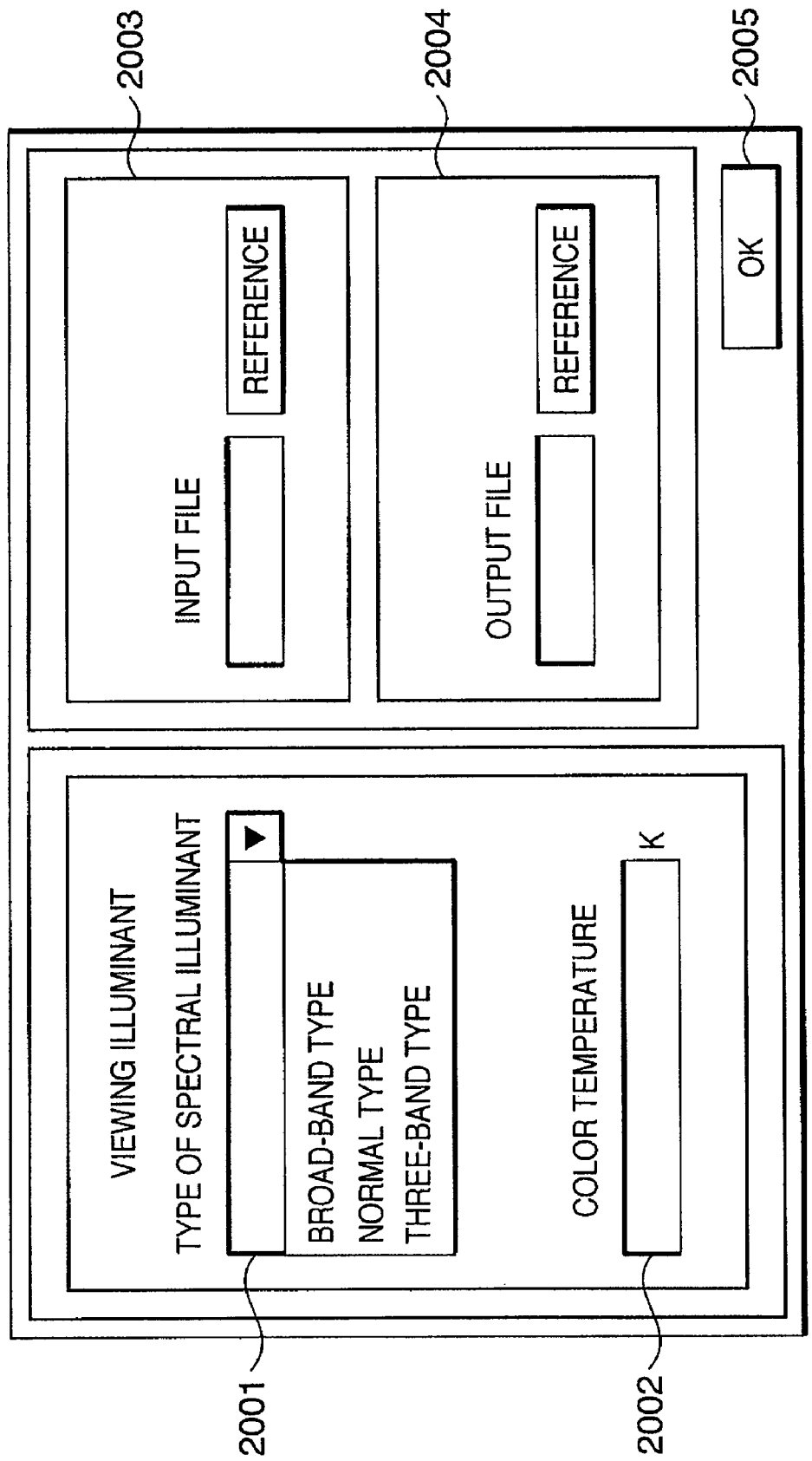
FIG. 11 is a view showing an example of a user interface.

FIG. 11 is a view illustrating an example of the user interface. The user interface includes a text box 2001 for inputting or setting the type of spectral distribution of a viewing illuminant, and a text box 2002 for inputting the color temperature of the viewing illuminant. The user interface further includes an input file setting section 2003 for inputting or setting the file name or path name of the input file 210 which describes calorimetric value sets of color patches measured under a plurality of reference illuminants. The user interface also includes an output file setting section 2004 for inputting or setting the file name or path name of a file 109 which describes a colorimetric value as a calculation result.

A user uses a mouse, keyboard, touch panel, dial, or the like (not shown) to operate the text boxes 2001 and 2002 or set a file name in the input file setting section 2003 or output file setting section 2004. When input of necessary instructions is complete, the user presses an OK button 2005. Note that the type of spectral distribution or the like is set in the pull-down menu of the text box 2001.

The calorimetric value obtaining unit 209 obtains the colorimetric value sets of color patches measured under a plurality of reference illuminants, from the input file 210 (obtaining source of calorimetric value) set in the input file setting section 2003 of the user interface, and stores them in a colorimetric value holding unit 106 (S52). The calorimetric value obtaining unit 209 connects to a serial bus such as a USB or IEEE1394 or a network. Therefore, the calorimetric value obtaining unit 209 can obtain the input file 210 from a computer apparatus or image input/output apparatus (e.g., a digital camera, scanner, printer, or the like) or a storage device or server device to read a calorimetric value set described in a predetermined format.

The white point calculation unit 202 calculates the CIEXYZ value of the viewing illuminant based on the color temperature of the viewing illuminant set in the text box 2002 of the user interface (S53). A CIEXYZ value cannot be uniquely determined from a color temperature. For this reason, in the second embodiment, for example, assume that the chromaticity of the viewing illuminant is on a CIE daylight locus, and a CIExy value is calculated by:

$$x = -4.6070(10^9/T^3) + \quad (4)$$
$$2.9678(10^6/T^2) + 0.09911(10^3/T) + 0.244063$$
$$y = -3.000x^2 + 2.870x - 0.275 \quad (5)$$

where T is the color temperature of the viewing illuminant.

Then, a CIEXYZ value is calculated from the CIExy value by:

$$X=100x/y$$

$$Y=100$$

$$Z=100(1-x-y)/y \quad (5)$$

An obtaining unit 102 obtains the type of spectral distribution, color temperature, and CIEXYZ value, which indicates the white point, of the viewing illuminant (S54). A selection unit 103 selects the calorimetric value sets of color patches measured under reference illuminants corresponding to the type of spectral distribution of the viewing illuminant obtained by the obtaining unit 102, and stores them in a predetermined area of a buffer memory 108 (S55).

A calculation unit 105 calculates or obtains a colorimetric value corresponding to the white point information of the viewing illuminant obtained by the obtaining unit 102, from each colorimetric value set selected by the selection unit 103 (S56). An output unit 104 describes the colorimetric value calculated or obtained by the calculation unit 105 in the file 109 in a predetermined format and outputs it in accordance with the setting in the output file setting section 1002 (S57).

Obtaining Unit

Figure 12:
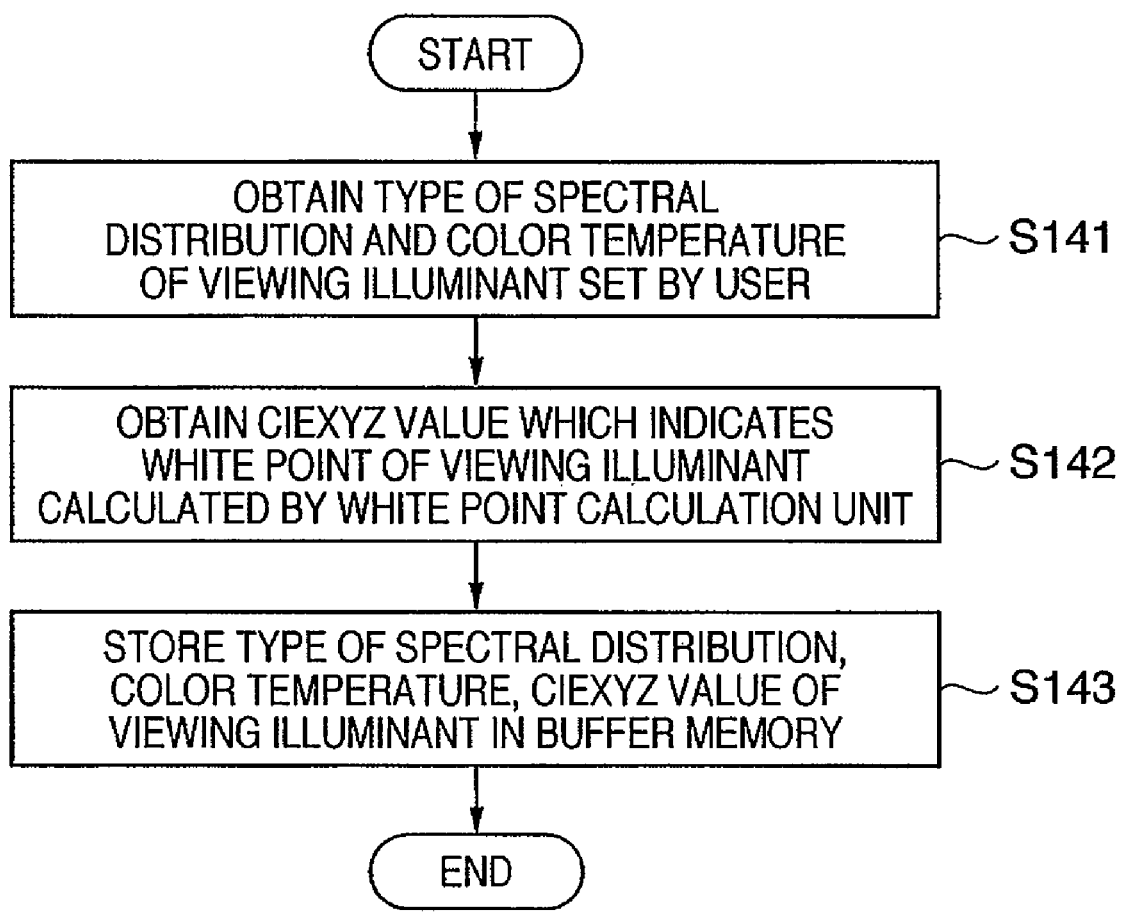
FIG. 12 is a flowchart for explaining the operation of an obtaining unit.

FIG. 12 is a flowchart for explaining the operation (S54) of the obtaining unit 102.

The obtaining unit 102 obtains the type of spectral distribution and color temperature of the viewing illuminant respectively set in the text boxes 2001 and 2002 of the user interface (S141), and obtains a CIEXYZ value, which indicates the white point of the viewing illuminant, calculated by the white point calculation unit 202 (S142). The obtaining unit 102 then stores the type of spectral distribution, color temperature, and CIEXYZ value of the viewing illuminant in a predetermined area of the buffer memory 108 (S143).

Selection Unit and Calculation Unit

The processing of the selection unit 103 is the same as in the first embodiment.

The calculation unit 105 obtains the CIEXYZ value calculated as the white point information by the white point calculation unit 202 from the buffer memory 108 in step S41. The calculation unit 105 further obtains the color temperature of the viewing illuminant from the buffer memory 108, in place of calculating the color temperature of the viewing illuminant, in step S43. The other processing of the calculation unit 105 is the same as in the first embodiment.

In this manner, the information (type of spectral distribution and color temperature) of the viewing illuminant simply designated by the user is obtained and a CIEXYZ value (white point information) which indicates the white point is calculated from the color temperature of the viewing illuminant. Then, colorimetric value sets obtained by measuring the colors of color patches under reference illuminants corresponding to the type of spectral distribution of the viewing illuminant are selected. From the colorimetric values under the selected reference illuminants, the colorimetric value of the viewing illuminant is calculated or obtained while considering the white point information of the viewing illuminant. Therefore, the same effect as in the first embodiment can be obtained.

Modification of Embodiment

A case has been described above in which the CIEXYZ value of the white point of the viewing illuminant is calculated from its color temperature while assuming that the chromaticity of the viewing illuminant is on a CIE daylight locus. However, any XYZ value on an isotemperature line defined on an xy chromaticity diagram may be used. That is, the CIEXYZ value of the white point may be calculated while assuming that the chromaticity of the viewing illuminant is on a CIE blackbody locus.

Third Embodiment

Color processing of the third embodiment according to the present invention will be described below. Note that the same components as in the first and second embodiments are denoted by the same reference numerals in the third embodiment, and a detailed description thereof will not be repeated.

[Arrangement of Apparatus]

Figure 13:
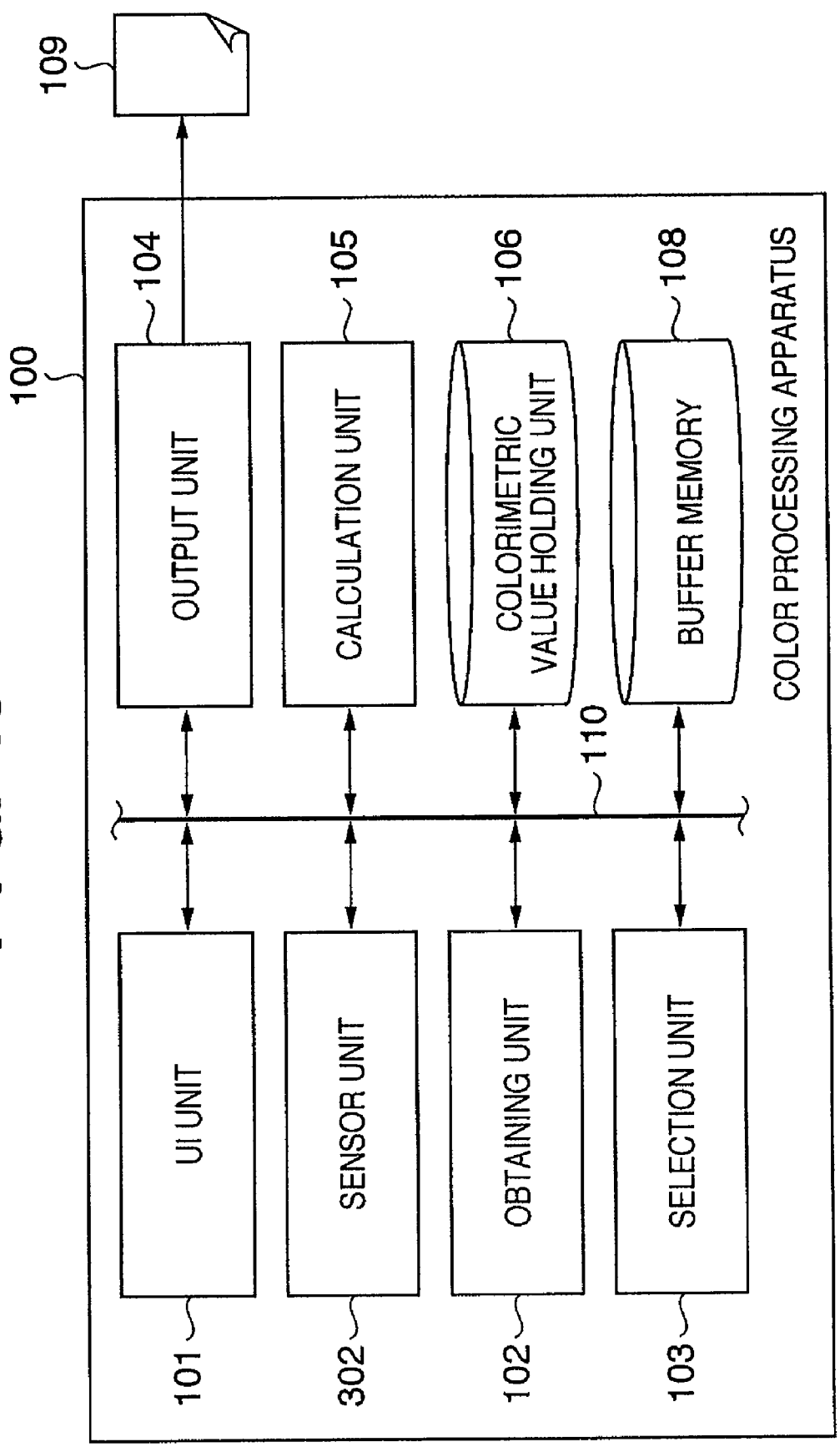
FIG. 13 is a block diagram showing the arrangement of a color processing apparatus of the third embodiment.

FIG. 13 is a block diagram showing the arrangement of a color processing apparatus 100 of the third embodiment. The arrangement of the color processing apparatus 100 is different from that of the first embodiment shown in FIG. 1 in that the color processing apparatus 100 comprises no table holding unit 107 but a sensor unit 302 including a sensor to measure the white point information of a viewing illuminant.

[Operation of Apparatus]

Figure 14:
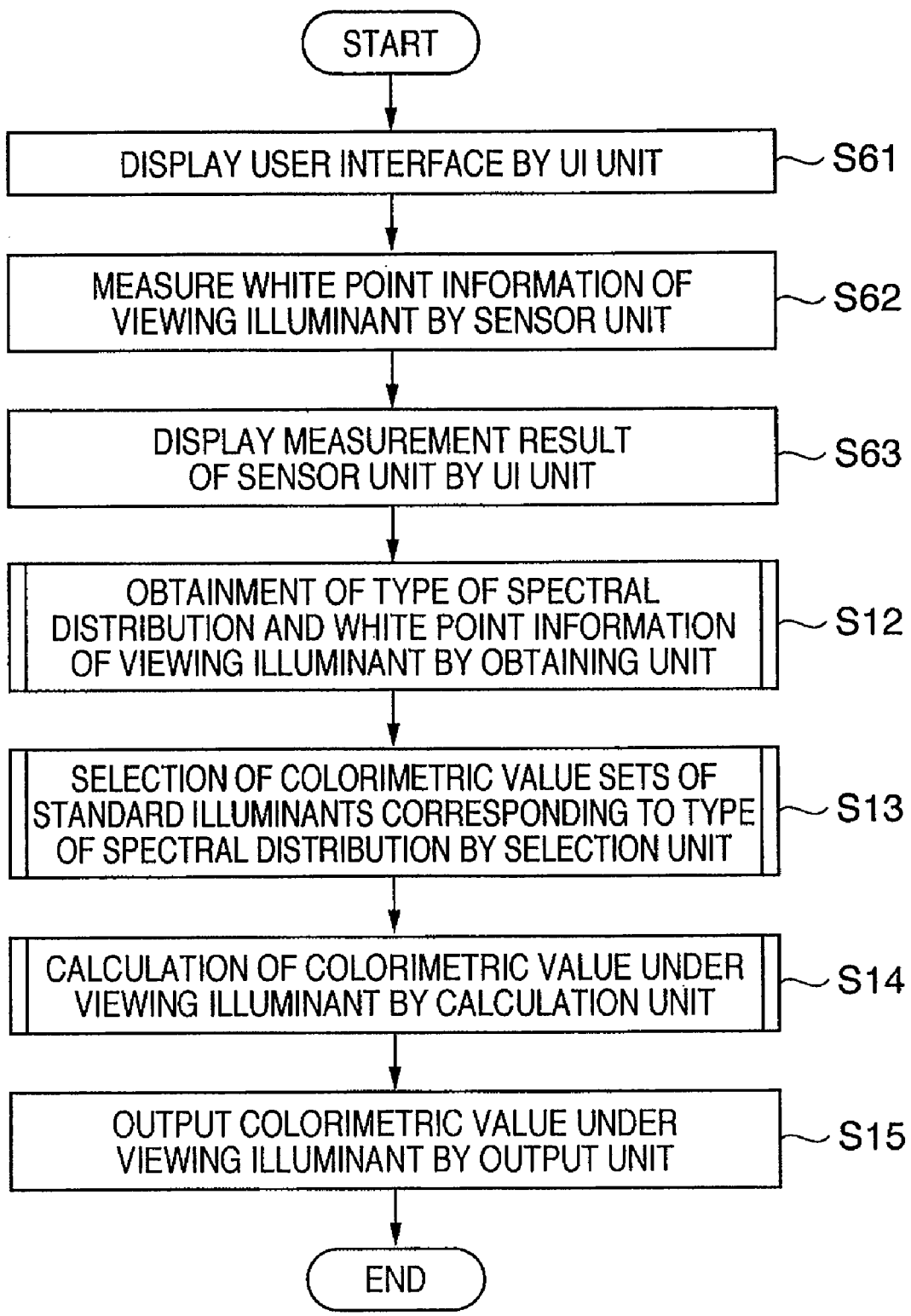
FIG. 14 is a flowchart illustrating the process of the color processing apparatus.

FIG. 14 is a flowchart illustrating the process of the color processing apparatus 100.

A UI unit 101 displays a user interface for a user to input information required to calculate a calorimetric value on a monitor (not shown) (S61).

Figure 15:
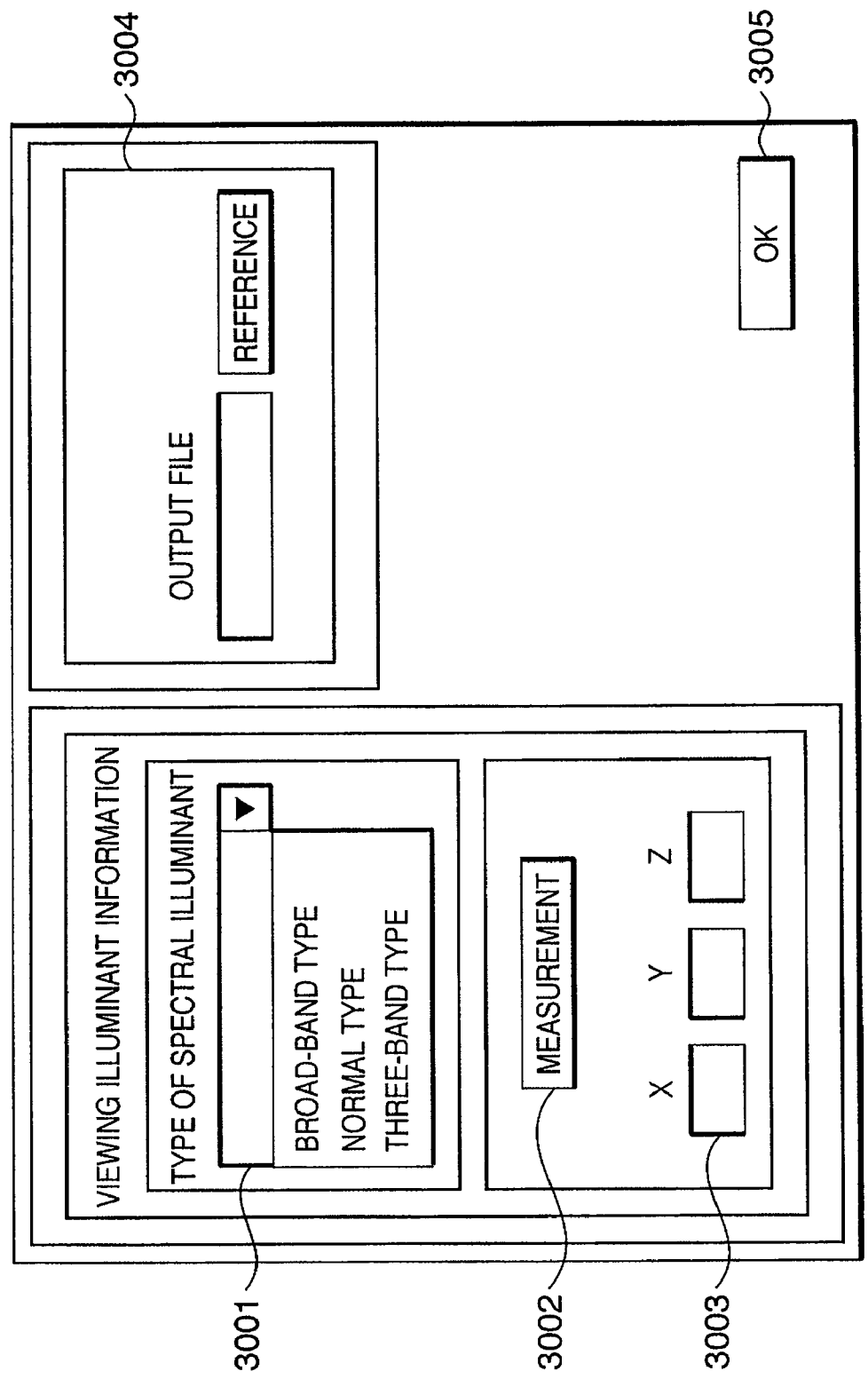
FIG. 15 is a view illustrating an example of a user interface.

FIG. 15 is a view illustrating an example of the user interface. The user interface includes a text box 3001 for inputting or setting the type of spectral distribution of a viewing illuminant, and a measurement button 3002 for measuring the color temperature of the viewing illuminant. The user interface further includes an output file setting section 3004 for inputting or setting the file name or path name of a file 109 which describes a colorimetric value as a calculation result.

When the measurement button 3002 of the user interface is pressed, the sensor unit 302 sets the light around the color processing apparatus 100 as a viewing illuminant, measures the white point information of the viewing illuminant, and stores the white point information in a predetermined area of a buffer memory 108 (S62). As for the sensor included in the sensor unit 302, any sensor can be used as long as it can measure the CIEXYZ value of a viewing illuminant. A relatively inexpensive sensor of a three-band filter form suffices for this purpose.

When the measurement by the sensor unit 302 is complete, the UI unit 101 displays the measurement result stored in a predetermined area of the buffer memory 108 on a white point information display section 3003 (S63).

When an OK button 3005 of the user interface is pressed, the same processing as in steps S12 to S15 shown in FIG. 2 is executed. Note that when the measurement button 3002 is pressed before the OK button 3005 is pressed, the color processing apparatus 100 repeats the processing in steps S62 and S63. That is, the user can repeatedly instruct to measure the white point information by pressing the measurement button 3002 until he or she determines that the white point information displayed on the white point information display section 3003 is appropriate.

In this manner, the sensor unit 302 enables the white point information of a viewing illuminant to be directly obtained, and the colorimetric value of the viewing illuminant can then be calculated or obtained.

Modification of Embodiments

In the above-described embodiments, as a viewing illuminant setting method, user selection of a light color symbol (the first embodiment), user setting of a type of spectral distribution and color temperature (the second embodiment), and user setting of a type of spectral distribution and a measurement by a sensor (the third embodiment) are described. A radio button or the like for selecting one of these setting methods may be added to the user interface to allow the user to select one of them.

In the third embodiment, the sensor unit 302 may measure not only the white point information of a viewing illuminant but also the type of spectral distribution of the viewing illuminant. In this case, a sensor which can determine the type of spectral distribution, that is, a sensor of a multi-band filter form or a sensor using a diffraction grating, is used as a sensor included in the sensor unit 302.

The above-described embodiments have exemplified a case in which the Von Kries transform is used to calculate a colorimetric value under a viewing illuminant. However, any conversion formula may be used as long as it is an approximate matrix to convert the illuminant of a colorimetric value, such as a CAT97 matrix used in CIECAM97s, a CAT02 matrix used in CIECAM02, or a Bradford matrix. Of course, a lookup table for conversion generated from one of the above conversion formulas in advance may be used.

The above-describe embodiments have exemplified a case in which an illuminant is converted by a conversion formula and then interpolation based on the ratio of color temperature is executed. However, for example, interpolation based on the ratio of distance on an XYZ space, CIExy chromaticity diagram, or CIEuv chromaticity diagram may be executed. Alternatively, interpolation may be executed by using, for example, the ratio of inverses of color temperatures. Interpolation may be applied not to a colorimetric value after illuminant conversion but to that before illuminant conversion. In other words, a calorimetric value is obtained by executing interpolation based on the ratio of color temperatures or the like, the illuminant of the obtained colorimetric value is converted, and the colorimetric value which underwent the illuminant conversion may be set as a calorimetric value under the viewing illuminant.

In the above-described embodiments, a reference illuminant under which the colors of color patches are measured is exemplified by calorimetric values under an illuminant such as a D50 illuminant, A illuminant, or fluorescent lamp F2 described in CIE or JIS. However, a reference illuminant is not limited to such references, and calorimetric values obtained by actually measuring the colors of color patches under a plurality of illuminants may be used.

FIG. 7 has exemplified a case in which six colorimetric value sets under reference illuminants are held in total, that is, two calorimetric value sets for each of three types of spectral distribution. However, the number of calorimetric value sets to be held is not limited to this, and, for example, three calorimetric value sets for each type of spectral distribution, that is, nine colorimetric value sets in total may be prepared. The number of calorimetric value sets to be held may be different for each type of spectral distribution, for example, three calorimetric value sets for broad-band type, two for three-band type, and one for normal type.

Exemplary Embodiments

The present invention can be applied to a system constituted by a plurality of devices (e.g., host computer, interface, reader, printer, mfp) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-117559, filed on Apr. 26, 2007, which is hereby incorporated by reference herein in its entirety.

What is claimed is:
1. A color processing apparatus, comprising:
a memory for storing a plurality of colorimetric value sets, each of which is associated with a type of spectral distribution and white point information;
an obtaining section, arranged to obtain a type of spectral distribution and white point information of a viewing illuminant;
a selector, operable to select a colorimetric value set corresponding to the type of spectral distribution of the viewing illuminant from the plurality of colorimetric value sets stored in the memory; and
a calculator, arranged to convert the selected colorimetric value set into a converted colorimetric value set based on the white point information of the viewing illuminant and the white point information of an illuminant of the selected colorimetric value set;

wherein, when color temperature of the illuminant of the selected colorimetric value set is not identical with that of the viewing illuminant, the calculator calculates a colorimetric values set under the viewing illuminant from the converted colorimetric value set based on the color temperature of the viewing illuminant and the color temperature of the illuminant of the selected colorimetric value set so as to output the colorimetric value set under the viewing illuminant, and wherein, when the color temperature of the illuminant of the selected colorimetric value set is identical with that of the viewing illuminant, the calculator outputs the selected colorimetric value set as the colorimetric value set under the viewing illuminant.

2. The apparatus according to claim 1, wherein the type of spectral distribution comprises a broad-band type, a normal type, or a three-band type.

3. The apparatus according to claim 1, wherein the white point information is a CIEXYZ value.

4. The apparatus according to claim 1, wherein the memory stores, for each of the type of spectral distribution, a plurality of colorimetric value sets obtained by measuring colors under reference illuminants having different color temperatures.

5. The apparatus according to claim 4, wherein, when the color temperature of the illuminant of the selected colorimetric value set is not identical with that of the viewing illuminant, the calculator executes a weighting operation for the converted colorimetric value set based on the color temperature of the selected colorimetric value set and the color temperature of the viewing illuminant to calculate the colorimetric value set under the viewing illuminant.

6. A method of a color processing comprising;

using a processor to perform the steps of:
  storing a plurality of colorimetric value sets, each of which is associated with a type of spectral distribution and white point information, in a memory;
  obtaining a type of spectral distribution and white point information of a viewing illuminant;
  selecting a colorimetric value set corresponding to the type of spectral distribution of the viewing illuminant from the plurality of colorimetric value sets stored in the memory;
  converting the selected colorimetric value set into a converted colorimetric value set based on the white point information of the viewing illuminant and the white point information of an illuminant of the selected colorimetric value set;
  calculating, when color temperature of the illuminant of the selected colorimetric value set is not identical with that of the viewing illuminant, a colorimetric values set under the viewing illuminant from the converted colorimetric value set based on the color temperature of the viewing illuminant and the color temperature of the illuminant of the selected colorimetric value set so as to output the colorimetric value set under the viewing illuminant; and
  outputting the selected colorimetric value set as the colorimetric value set under the viewing illuminant when the color temperature of the illuminant of the selected colorimetric value set is identical with that of the viewing illuminant.

7. A non-transitory computer-readable medium storing a computer executable program for causing a computer to function as a color processing apparatus according to claim 1.

* * * * *